May 19, 1936.  L. E. LA BRIE  2,041,074
INTERNAL COMBUSTION ENGINE
Filed July 29, 1932  2 Sheets-Sheet 1

INVENTOR.
Ludger E. LaBrie

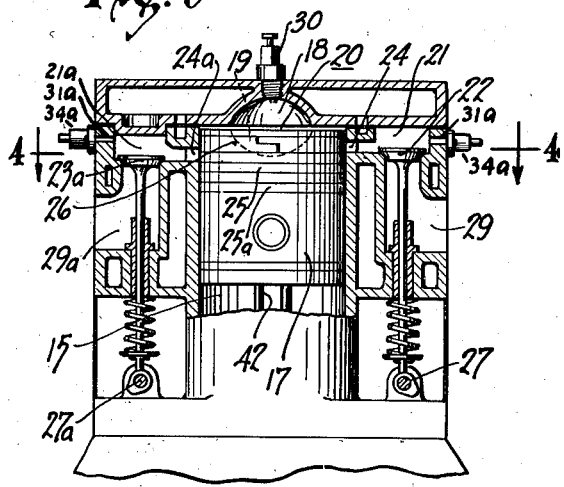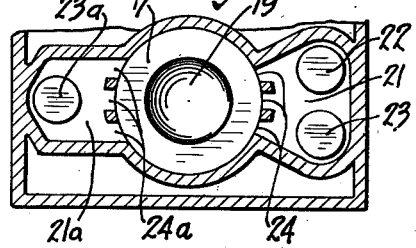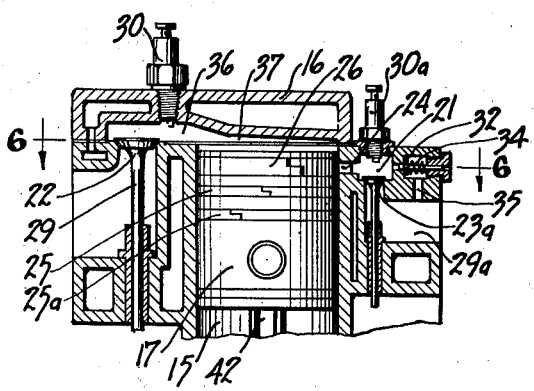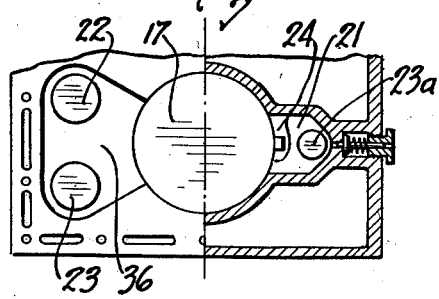
INVENTOR.
Ludger E. LaBrie

Patented May 19, 1936

2,041,074

UNITED STATES PATENT OFFICE 2,041,074

INTERNAL COMBUSTION ENGINE

Ludger E. La Brie, South Bend, Ind.

Application July 29, 1932, Serial No. 626,150

8 Claims. (Cl. 123—37)

This invention relates to engines and more particularly to internal combustion engines and to arrangements of the combustion chambers thereof.

In most high compression internal-combustion engines in use on automotive vehicles, it is necessary to use some form of "doped" or "anti-knock" fuel in order to obtain smooth operation and to avoid the well known phenomenon of detonation. Investigators have demonstrated by means of laboratory tests that the primary cause of detonation is due to super compression of the unburned portion of the charge as the flame front travels from the spark plug or initial ignition point towards the combustion chamber walls, causing said unburned portion of the charge to explode instantaneously, and producing unusually high pressures in the cylinder which cause the so-called "ping" or "knock". This knock is due to the fact that at the time of the instantaneous explosion of the unburned portion of the charge, the piston is still moving inwards on its compression stroke, and this is also the reason for the low efficiency of the engine under conditions of detonation. Under normal operating conditions, the burning rate of the explosion is comparatively slow. Experiments have shown that the speed of flame propagation is approximately eighty feet per second. This amounts to forty-eight hundred feet per minute, or only about twice as fast as the maximum piston speed in high speed internal combustion engines. For this reason is is necessary to ignite the charge before the piston reaches top dead center in order to have maximum explosion pressures when the piston has just passed dead center and begins its outward working stroke. It will now be readily understood that the chief source of trouble caused by detonation in conventional engines is due to the fact that the piston is still moving inwards when detonation takes place, and that the high pressures developed by detonation (or instantaneous burning of a portion of the charge) are not utilized in driving the piston, but tend to retard its movement.

An object of this invention is to provide an internal combustion engine which utilizes the high pressures caused by detonation to do useful work, and thereby produce a high degree of efficiency. In other words, to provide an internal combustion engine in which detonation is a normal function in its operation. This is accomplished by preventing detonation from taking place during inward movement of the piston on its compression stroke, and by producing detonation of a part or of several parts of the charge during the outward movement of the piston on its expansion stroke.

Another object of the invention is to provide an internal combustion engine in which the explosion pressures are more uniform throughout the working stroke, thereby producing a high degree of flexibility.

Another object of the invention is to provide an internal combustion engine in which the combustible charge is compressed into a plurality of combustion chambers, the combustible charge in the first or primary combustion chamber being ignited by an electric spark, or by means of high compression, while the combustible charge in the remainder or auxiliary combustion chambers is successively ignited by the flames of the explosion after the piston has started and continues to travel outward on its working stroke.

A further object of the invention is to provide an internal combustion engine in which the combustible charge is compressed in a plurality of combustion chambers successively as the piston travels inward on its compression stroke, the degree of compression in each chamber being successively higher as the piston nears the end of its compression stroke, resulting in the volume of the main combustion chamber formed by the cylinder head and the piston head being greatly reduced and making possible greatly increased compression without detonation.

Other objects and advantages will appear in the following specification, and the novel features of the invention are particularly pointed out in the appended claims.

My invention is illustrated in the accompanying drawings forming part of this application in which:

Figure 3 is a vertical section through an engine of the four stroke cycle type embodying another form of the invention;

Figure 4 is a horizontal section on line 4—4 of Figure 3;

Figure 5 is a vertical section through an engine of the four stroke cycle type embodying another form of the invention;

Figure 6 is a horizontal section on line 6—6 of Figure 5.

Figure 1:
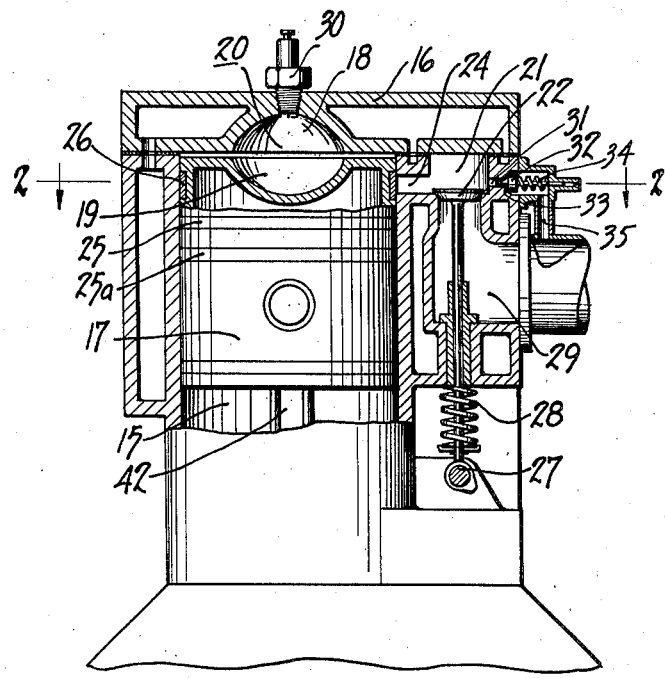
Figure 1 is a vertical section through an engine embodying one form of the invention as applied to an internal combustion engine of the four stroke cycle type.
Figure 2:
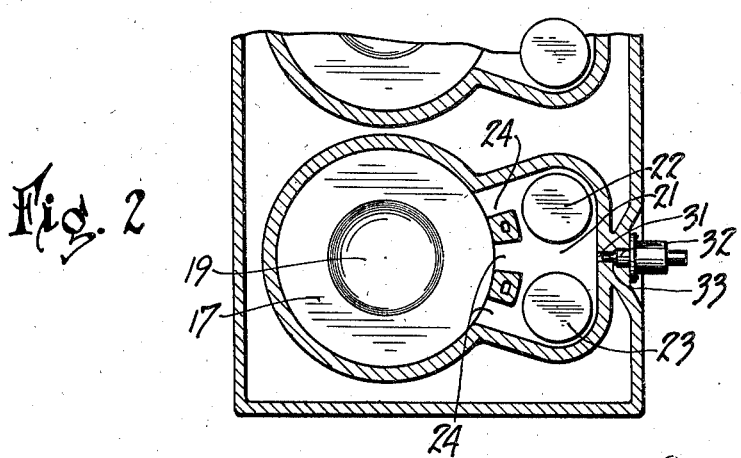
Figure 2 is a horizontal section taken on the line 2—2 of Figure 1.

The four stroke cycle engine illustrated in Figures 1 and 2 comprises a cylinder 15 provided with a cylinder head 16 and a piston 17. The cylinder head 16 has a semispherical pocket 18 disposed centrally over the axis of the cylinder 15, and the piston 17 has a corresponding semi-spherical pocket 19 which cooperates with pocket 18 in the cylinder head to form a generally spherical combustion chamber, except for the clearance between the piston 17 and the cylinder head 16. The volume represented by the pockets 18 and 19 and the clearance between them constitutes the primary combustion chamber and which will be hereinafter identified by the numeral 20.

The cylinder 15 is provided with an auxiliary combustion chamber 21 in which are placed the intake and exhaust valves 22 and 23, respectively. Communication between the auxiliary combustion chamber 21 and the interior of the cylinder 15 is provided by a plurality of ports 24.

The piston 17 is provided with conventional sealing rings 25 and 25a except that the top ring 26 is wider than the others, in order to effectively seal the ports 24 at the time of ignition in the primary combustion chamber 20.

The inlet and exhaust valves 22 and 23 are actuated in the conventional manner by means of the cam shaft 27 and valve springs 28, said cam shaft being driven at half crank shaft speed. The ports 29 are provided with the usual intake and exhaust manifolds.

From the foregoing it will be seen that as the piston 17 moves outward on its intake stroke, a charge of combustible mixture will be drawn through the ports 29, through the open intake valve 22, chamber 21 and ports 24 into the cylinder. As the piston 17 moves inward on its compression stroke the inlet valve 22 closes and the mixture is compressed into chambers 20 and 21. As the piston nears top dead center on its compression stroke the sealing ring 26 is adjacent the ports 24 thus shutting off communication between the chambers 20 and 21. At this point the spark plug 30 is made to fire by means of the conventional electrical ignition apparatus. The resulting explosion in the primary combustion chamber 20 now drives the piston 17 outward on its working stroke, causing said piston 17 to uncover the ports 24 and suddenly exposing the combustible charge previously compressed in auxiliary chamber 21 to the flames and high explosion pressures which are at this time present in the primary combustion chamber 20. Under these conditions, the unburned charge in chamber 21 will be further compressed by the high pressures of explosion existing in chamber 20 before said unburned charge has time to burn completely at the normal rate of approximately eighty feet per second, until a point is reached when the unburned portion of said charge will explode instantaneously and thus create very high pressures in chambers 21 and 20 since both are in communication through the ports 24. It will be noted at this point that the piston 17 is now moving outwards on its working stroke, so that the very high pressures created by detonation, (or instantaneous burning of the charge in chamber 21 as explained above), are utilized in full to do useful work in driving the piston 17.

It should be noted also, that since the primary combustion chamber 20 formed by the piston 17 and the cylinder head 16 is of ideal spherical shape, and since its volume is greatly reduced due to the presence of the auxiliary combustion chamber 21, the possibility of detonation in said chamber 20 is very remote. Further, it is now possible to employ much higher compression in chamber 20 than would be possible in a conventional engine. It will be evident that the compression pressure in chamber 21 will be somewhat less than in chamber 20; however, the compression can be increased to such an extent without detonation in chamber 20, that the compression pressure in chamber 21 can be as high or higher than in conventional engines. This in itself contributes considerably to greater efficiency and is in addition to the major increase in efficiency which is produced by the high pressures of detonation in chamber 21 after the piston has uncovered the ports 24 and is moving outwards on its working stroke.

It will also be apparent at this time, that by the time that the explosion pressures in the main combustion chamber 20 have reached their maximum value and have begun to decrease slightly, the ports 24 are uncovered by the piston 17 resulting in the second explosion (as described above) in the auxiliary chamber 21 producing still higher pressures than the maximum reached in chamber 20. Under these conditions, the explosion pressures are kept at high value over a much greater portion of the working stroke of the piston than is the case in conventional engines, resulting in greatly increased flexibility of the engine embodying the invention. It is also apparent that this degree of flexibility can be varied by the distance of the ports 24 and chamber 21 from the top of the cylinder, resulting in greater or less travel of the piston before the ports 24 are uncovered.

As hereinbefore described the ports 24 are closed by the sealing ring 26 at the time of explosion in chamber 20. At this time the chamber 21 is filled with a combustible mixture which has previously been compressed by the piston. Due to excessive carbon after long use, or to a hot spot, pre-ignition may sometimes take place in chamber 21, and this might result in undue strain on the engine. In order to obviate this difficulty, a safety valve is provided, comprising an opening 31 leading from chamber 21, said opening being closed by a plunger 32 normally held against a conical seat 33 by a spring 34. The opening 31 communicates with a valve chamber and the valve chamber in turn communicates with the exhaust manifold through the port 35. If under abnormal operating conditions pre-ignition should take place while the ports 24 are covered by the ring 26, the abnormally high pressures in chamber 21 will lift piston 32 from its seat allowing some of the gases to escape through port 35 to the exhaust manifold thus relieving the pressures and preventing undue strain or injury of the engine. The spring 34 is made of such modulus of elasticity as to offer a resistance to the lifting of plunger 32 from its seat such that said plunger 32 is inoperative under normal explosion pressures in chamber 21; or when the ports 24 are uncovered by the piston 17. If, however, pre-ignition takes place in chamber 21 before said ports 24 are uncovered the plunger 32 will be lifted from its seat before the pressures in chamber 21 attain a value sufficient to burst the walls of combustion chamber 21. Thus it will be seen that a considerable margin exists between normal operating pressures in chamber 21 and the pressures necessary to lift plunger 32 from its seat, and this prevents said plunger 32 from being operative under normal operating conditions of the engine.

Figures 3 and 4 illustrate an engine of the four stroke cycle type embodying another form of the invention. In this arrangement, two auxiliary combustion chambers are employed. In addition to the auxiliary combustion chamber 21, a second auxiliary chamber 21a is provided diametrically opposite said chamber 21, and at a greater distance from the top of the cylinder than the latter. Said auxiliary chamber 21a is provided with an exhaust valve 23a actuated by an auxiliary cam-shaft 27a.

Each of the auxiliary combustion chambers 21 and 21a is provided with a pressure relief device indicated at 34a communicating with the respective chambers through passages 31a. The pressure relief devices 34a may be arranged to discharge directly to atmosphere or may be connected to discharge into the exhaust manifold as shown in Figures 1 and 2.

The combustible charge is drawn through port 29, through the open inlet valve 22, chamber 21, ports 24 and into the cylinder 15. As the piston moves inward on its compression stroke, the combustible charge is compressed first into auxiliary chamber 21a, then into auxiliary chamber 21 and finally into the primary combustion chamber 20. As the piston nears top dead center on its compression stroke, the charge in the primary combustion chamber 20 is ignited by means of the spark plug 30. As the piston moves outward on its working stroke, it uncovers the ports 24 of chamber 21 causing explosion of the charge in said chamber 21 as hereinbefore described. Further movement of the piston 17 uncovers the ports 24a of chamber 21a causing explosion of the charge in said chamber 21a. As the piston nears bottom dead center on its working stroke, the exhaust valves 23 and 23a are opened allowing effective scavenging of the cylinder 15 and of the auxiliary combustion chambers 21 and 21a.

In this arrangement of Figures 3 and 4 the flexibility of the engine is further increased since the working stroke is divided into three separate explosions, instead of one as in the conventional engine. This results in still more travel of the piston while the pressure in the cylinder is at a maximum value, thus producing considerably increased torque at low engine speeds, and which is an important requirement for internal combustion engines used in automotive vehicles.

It will be noted also that since detonation takes place in the auxiliary combustion chambers 21 and 21a the burning of the mixture is complete, and, this coupled with the valve arrangement which is equivalent to two exhaust valves per cylinder, produces ideal scavenging of the engine and contributes further to its efficiency.

Figures 5 and 6 illustrate another form of the invention adapted to an otherwise conventional side valve four stroke cycle internal combustion engine. In this arrangement, the primary combustion chamber comprises the pocket 36 over the intake and exhaust valves 22 and 23 respectively, and partially overlying the clearance 37. The auxiliary combustion chamber 21 is placed diametrically opposite chamber 36 and is provided with an exhaust valve 23a operated by a cam shaft (not shown). In addition to ignition of the charge in auxiliary combustion chamber 21 by the flames of explosion in the cylinder at the time that ports 24 are uncovered, additional ignition means are provided in the form of an auxiliary spark plug 30a. This plug is made to fire simultaneously with the uncovering of ports 24 by the piston 17. This arrangement is desirable where maximum output for a given amount of fuel is less important than smoothness of operation, since it would tend to reduce the degree of detonation in chamber 21.

While several illustrative embodiments are described herein in detail, it is not my intention to limit the scope to those particular embodiments, or otherwise than by the appended claims.

I claim:

1. An engine having, in combination with a power cylinder, means forming a combustion space cut off from the cylinder during part of the engine cycle, and a pressure-relief device arranged in said combustion space.

2. An engine having means forming a main combustion chamber and means forming an auxiliary combustion chamber on each side of the main chamber, and arranged to have the auxiliary chambers cut off from the main chamber during a part of the engine cycle, and having a pressure-relief device in each of said auxiliary chambers.

3. An engine having means forming a main combustion chamber and means forming an auxiliary combustion chamber on each side of the main chamber, a piston arranged to cut off the auxiliary chambers from the main chamber at the top of its stroke, and a pressure-relief device in each of said auxiliary chambers.

4. An engine having means forming a main combustion chamber, a piston, means forming a plurality of auxiliary combustion chambers respectively cut off from the main chamber at different points in the piston stroke, and a pressure-relief device in each auxiliary chamber.

5. An engine having a cylinder with a cylinder head, and a piston in the cylinder, the piston and cylinder head having registering semi-spherical recesses jointly forming a main combustion chamber at the top of the piston stroke, and having means forming an auxiliary combustion chamber at one side of the cylinder which is cut off from the main combustion chamber by the piston at the top of its stroke and a pressure responsive relief device in said auxiliary chamber.

6. An engine having a cylinder with a cylinder head, and a piston in the cylinder, and having a main combustion chamber formed partly in the piston and partly in the cylinder head the parts coming together to hold a compressed fuel charge at the top of the piston stroke, and having means forming an auxiliary combustion chamber at one side of the cylinder which is cut off from the main combustion chamber by the piston at the top of its stroke and a pressure responsive relief device for venting said auxiliary chamber above a predetermined pressure.

7. An engine having a cylinder with a cylinder head, and a piston in the cylinder, and having a main combustion chamber formed partly in the piston and partly in the cylinder head the parts coming together to hold a compressed fuel charge at the top of the piston stroke, and having means forming two auxiliary combustion chambers one at each side of the cylinder and which are cut off from the main combustion chamber by the piston at the top of its stroke and a pressure relief device in each of the auxiliary chambers.

8. An engine having means forming a main combustion space and means forming an auxiliary combustion space cut off from the main combustion space during part of the engine cycle and an exhaust manifold, and a pressure relief device for relieving the pressure in said auxiliary space directly into the exhaust manifold at a predetermined pressure.

LUDGER E. LA BRIE.